(12) United States Patent
Sathiaraj

(10) Patent No.: US 11,790,244 B2
(45) Date of Patent: Oct. 17, 2023

(54) PREDICTIVE ANALYTICAL SYSTEM AND METHOD

(71) Applicant: Board of Supervisors of Louisiana State University and Agricultural and Mechanical College, Baton Rouge, LA (US)

(72) Inventor: David Sathiaraj, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 1335 days.

(21) Appl. No.: 16/230,691

(22) Filed: Dec. 21, 2018

(65) Prior Publication Data

US 2019/0205770 A1   Jul. 4, 2019

Related U.S. Application Data

(60) Provisional application No. 62/611,083, filed on Dec. 28, 2017.

(51) Int. Cl.
| | |
|---|---|
| *G06N 5/02* | (2023.01) |
| *G06F 16/28* | (2019.01) |
| *G07C 13/00* | (2006.01) |

(52) U.S. Cl.
CPC .............. *G06N 5/02* (2013.01); *G06F 16/285* (2019.01); *G07C 13/00* (2013.01)

(58) Field of Classification Search
CPC .......... G06N 5/02; G06F 16/285; G07C 13/00
See application file for complete search history.

(56) References Cited

U.S. PATENT DOCUMENTS

| | | | |
|---|---|---|---|
| 8,195,505 B2 * | 6/2012 | Poulos ................. | G06Q 20/382 705/64 |
| 8,478,636 B2 * | 7/2013 | Jeffrey .................. | G07C 13/00 235/386 |

(Continued)

FOREIGN PATENT DOCUMENTS

WO   WO-2018176053 A1 *   9/2018   ....... G06F 17/30979

OTHER PUBLICATIONS

Ansolabehere et al., "Validation: What Big Data Reveal About Survey Misreporting and the Real Electorate," Political Analysis, vol. 20, 2012, pp. 437-459.

(Continued)

*Primary Examiner* — Kristie D Shingles
(74) *Attorney, Agent, or Firm* — Thomas | Horstemeyer, LLP

(57) ABSTRACT

A system and method for generating a predictive model include accessing data from a dynamic dataset and a static dataset, generating a unique individual profile for each of a plurality of subjects within a population, assigning a class attribute to each subject, and based on the unique individual profile and the class attribute for each subject, developing a classification model based on the unique individual profile and the class attribute for each of the plurality of subject, and generating an individual score for each of the plurality of subjects using the classification model. The unique individual profile is generated from the data in the dynamic and the static datasets.

20 Claims, 6 Drawing Sheets

(56) References Cited

U.S. PATENT DOCUMENTS

| | | | |
|---|---|---|---|
| 8,523,052 B2* | 9/2013 | Moore | G06Q 50/26 |
| | | | 235/51 |
| 8,725,663 B1 | 5/2014 | Triantaphyllou et al. | |
| 10,552,432 B2* | 2/2020 | Govindarajan | G06F 16/90348 |
| 2009/0254971 A1* | 10/2009 | Herz | G06Q 10/10 |
| | | | 726/1 |
| 2009/0313094 A1 | 12/2009 | Singh | |
| 2010/0325179 A1 | 12/2010 | Tranter | |
| 2014/0229841 A1 | 8/2014 | Muller et al. | |
| 2019/0213446 A1* | 7/2019 | Tsou | G06F 18/2148 |

OTHER PUBLICATIONS

Ansolabehere et al., "ADGN: an Algorithm for Record Linkage Using Address, Date of Birth, Gender and Name," Statistics and Public Policy, vol. 4, No. 1, 2017, 10 Pages.

Anstead, "Data-Driven Campaigning in the 2015 United Kingdom General Election," International Journal of Press/Politics, vol. 22, No. 3, 2017, pp. 294-313.

Barfar et al., "Predicting Presidential Election Outcomes from What People Watch," Big Data, vol. 5, No. 1, 2017, pp. 32-41.

Bhattacharya et al., "Perceptions of Presidential Candidates' Personalities in Twitter," Journal of the Association for Information Science and Technology, vol. 67, No. 2, 2016, pp. 249-267.

Bialik et al., "The Polls Missed Trump. We Asked Pollsters Why," retrieved from https://fivethirtyeight.com/features/the-polls-missed-trump-we-asked-pollsters-why, Nov. 9, 2016, 4 Pages.

Bilenko et al., "Adaptive Name Matching in Information Integration," IEEE Intelligent Systems, vol. 18, No. 5, 2003, pp. 16-23.

Breiman, "Random Forests," Machine Learning, vol. 45, No. 1, 2001, pp. 5-32.

"Crossfilter Fast Multidimensional Filtering for Coordinated Views," retrieved from http://square.github.io/crossfilter/ on Nov. 22, 2015, 2 Pages.

David et al., "Utilizing Facebook Pages of the Political Parties to Automatically Predict the Political Orientation of Facebook Users," Online Information Review, vol. 40, Sep. 2016, pp. 610-623.

"Docker," retrieved from http://docker.com on Nov. 22, 2015, 6 Pages.

Elmagarmid et al., "Duplicate Record Detection: a Survey," IEEE Transactions on Knowledge Data and Engineering, vol. 19, No. 1, Jan. 2007, 16 Pages.

Fulgoni et al., "The Power of Political Advertising: Lessons for Practitioners How Data Analytics, Social Media, and Creative Strategies Shape US Presidential Election Campaigns," Journal of Advertising Research, vol. 56, Sep. 2016, pp. 239-244.

Gerber et al., "Why Don't People Vote in US Primary Elections? Assessing Theoretical Explanations for Reduced Participation," Electoral Studies, vol. 45, 2017, pp. 119-129.

Giraud-Carrier et al., "Effective Record Linkage for Mining Campaign Contribution Data," Knowledge and Information Systems, vol. 45, No. 2, Nov. 2015, pp. 389-416.

Hamburger, "Cruz Campaign Credits Psychological Data and Analytics for its Rising Success," retrieved from http://wpo.st/QzI41, Dec. 13, 2015, 4 Pages.

Hearst et al., "Support Vector Machines," IEEE Intelligent Systems Applications, vol. 13, No. 4, Jul. 1998, pp. 18-28.

Herzog et al., "Record Linkage," WIREs Computational Statistics, vol. 2, 2010, pp. 535-543.

Holubiec et al., "A Knowledge-Based Model of Parliamentary Election," Information Sciences, vol. 202, 2012, pp. 24-40.

Howard, "Deep Democracy Thin Citizenship: the Impact of Digital Media in Political Campaign Strategy," Annals of the American Academy of Political and Social Science, vol. 597, Jan. 2005, pp. 153-170.

Issenberg, "How Obama Used Big Data to Rally Voters, Part 1," MIT Technology Review, Dec. 16, 2012, 10 Pages.

Jungherr, "Four Functions of Digital Tools in Election Campaigns: the German Case," International Journal of Press/Politics, vol. 21, No. 3, 2016, pp. 358-377.

"Louisiana Secretary of State Statewide Report of Registered Voters," retrieved from https://goo.gl/ZGLkRF on Oct. 31, 2017.

Lee et al., "Weather, Voter Turnout and Partisan Effects in Korea, 1995-1999," Asian Journal of Social Science, vol. 45, 2017, pp. 507-528.

Martin, "Ethical Issues in the Big Data Industry," MIS Quarterly Executive, vol. 14, No. 2, Jun. 2015, pp. 67-85.

Mehta, "How Much the Polls Missed by in Every State," retrieved from https://fivethirtyeight.com/features/how-much-the-polls-missed-by-in-every-state, Dec. 2, 2016, 3 Pages.

Mercer et al., "Why 2016 Election Polls Missed Their Mark," Pew Research Center, retrieved from http://pewrsr.ch/2fmNGH6, Nov. 9, 2016, 3 Pages.

"MongoDB for GIANT Ideas," retrieved from http://mongodb.com on Nov. 21, 2015, 3 Pages.

Myers, "Louisiana Votes Red Even as Democrats, Republicans Lose Sway," NOLA.com, retrieved from https://goo.gl/fRwRrH, Nov. 4, 2014, 7 Pages.

Nickerson et al., "Political Campaigns and Big Data," Journal of Economic Perspectives, vol. 28, No. 2, 2014, pp. 51-74.

"Node.js," retrieved from http://nodejs.org on Nov. 20, 2015, 2 Pages.

"PostgreSQL: the World's Most Advanced Open Source Database," retrieved from http://postgresql.org on Nov. 22, 2015, 3 Pages.

Rubinstein, "Voter Privacy in the age of Big Data," Wisconsin Law Review, 2014, pp. 861-936.

Sathiraj et al., "Improving Predictive Accuracy in Elections," Big Data, vol. 5, No. 4, 2017, 13 Pages.

Siegert et al., "Classification-based Record Linkage with Pseudonymized Data for Epidemiological Cancer Registries," IEEE Transactions in Multimedia, vol. 18, No. 10, Oct. 2016. pp. 1929-1941.

Silver, "The Polls Were Skewed Toward Democrats," retrieved from http://goo.gl/kgNN5Z, Nov. 5, 2014, 6 Pages.

Smith, "The Diverse Impacts of Politically Diverse Networks: Party Systems, Political Disagreement, and the Timing of Vote Decisions," International Journal of Public Opinion Research, vol. 27, No. 4, Dec. 1, 2015, pp. 481-496.

Tsapatsoulis et al., "On the Design of Social Voting Recommendation Applications," International Journal on Artificial Intelligence Tools, vol. 24, No. 3, 2015, 20 Pages.

Valentino et al., "Polling and Prediction in the 2016 Presidential Election," Computer, vol. 50, 2017, pp. 110-115.

* cited by examiner

Require: $V_f$ and $C$ (static components) and dynamic component set $DC=\{P,G,D\}$.
1: Initialize array *MatchedIds* = ∅
2: Initialize array *classLabels* = ∅
3: for each dataset $dc$ in $DC$ do
4:    for each row iterator $i$ in $dc$ do
5:       Find $V_f$ [id] such that $V_f$ [phonenum]=i[phonenum] and
      $V_f$ (gender) = i[gender] and $V_f$ [race] = i[race]
6:       if $V_f$ [id] is found then
7:          *MatchedIds* = *MatchedIds* + $V_f$ [id]
8:          *classLabels* = *classLabels* + *Label* ($c_1$ or $c_2$) {based on response question in dataset}
9:       end if
10:    end for
11: end for
12: Initialize matrix $T_t$ = ∅
13: for each id in *MatchedIds* do
14:    $T_t = T_t + (V_f$ [id] + $C$[id]) {matrices $V_f$ and $C$ are collated column-wise, matrix $T_t$ is appended row-wise}
15: end for
16: Append *classLabels* vector to $T_t$.
17: Train a Classification Algorithm ML using $T_t$ to get fitted model $M_0$
18: Generate unlabeled, test data $T_g$ by column-wise collation of matrices $V_f$ and $C$.
19: Use Model $M_0$ on test data set $T_e$ to predict probabilistic scores *ScoreSet*.
20: return *ScoreSet*.
21: Repeat algorithm (steps 1–20) as new time-relevant datasets (such as new polls, grassroots data, updated donor files etc) are added in the set $DC$

FIGURE 4

PREDICTIVE ANALYTICAL SYSTEM AND METHOD

CROSS-REFERENCE TO RELATED APPLICATIONS

This application claims the benefit of and priority to U.S. Provisional Patent Application Ser. No. 62/611,083 filed on Dec. 28, 2017 and entitled "Predictive Analytical Systema and Method," which application is expressly incorporated herein by reference in its entirety.

BACKGROUND

Over the last decade, data analytics has evolved to become a leading component of competitive advantage in just about every field. Medicine, finance, sports and software development are few of the various areas where this new and still rapidly growing field continues to make its mark. That being said, there are also a few fields where data analytics is poised to make a significant impact in the next decade and beyond but has not done so as of now. One such field is data analytics driven political campaigns. While polls, voter prediction tools, and advertisements have been used for several decades, the concept of using cutting-edge statistical tools to parse and accurately target different voter groups is still in its technological infancy.

Properly associating voter data with respective voter records and calculating a likely voting outcome provides several unique and difficult challenges. Conventional analytics as used within marketing, typically rely upon data gathered by a small number of sources. For example, a search engine may associate user browsing habits with a profile created for the particular user. In some cases, additional survey information may also be added to the profile, but the survey information can be normalized to match the profile data entries. In contrast, political data typically comes from a tremendously large variety of different sources, including historical voting records, demographic records, survey results, official party associations, campaign donations, analytic data relating to peripheral bills and measures, and many other such data sources.

The conventional art fails to provide the necessary tools and systems for efficiently and accurately providing election based analytic information. Accordingly, there are needs in the art for systems and methods for predictive analytics in target campaigns.

BRIEF SUMMARY

The present disclosure provides systems, methods, and apparatuses configured to process and associate disparate data with potential human driven outcomes. In particular, the present disclosure provides significant benefits in modeling and predicting behaviors based upon processed data. For example, data can be associated with individuals, categorized, and scored. The present disclosure provides for significantly increased accuracy and speed in analyzing large and disparate data sources.

A predictive system is provided that is configured to process and associate disparate data with potential human driven outcomes can comprise an act of receiving dynamic inputs comprising datasets of human-associated information. The system can also be configured to match individual records within the received dynamic inputs with one or more larger datasets. Additionally, the system can sort each of the individual records into one or more classes. The system can also generate a machine learning training set based upon the one or more classes. Further, the system can generate from a machine learning process a predictive model for scoring individual records based upon each respective individual records predicted strength of affiliation with at least one of the one or more classes. Further still, the system can generate an individual score associated with an individual record based the predictive model.

A method is also provided for processing and associating disparate data with potential human driven outcomes. The method can comprise an act of receiving dynamic inputs comprising datasets of human-associated information. The method can also comprise an act of matching individual records within the received dynamic inputs with one or more data elements within larger datasets. The one or more larger datasets can comprise identification indicators associated with one or more data elements. Additionally, the method can comprise an act of sorting each of the individual records into one or more classes. Each of the one or more classes can be associated with a label. The method can comprise an act of generating a machine learning training set based upon the one or more classes. Further, the method can comprise an act of generating from a machine learning process, using the machine learning training set, a predictive model for scoring individual records based upon each respective individual record's predicted strength of affiliation with at least one of the one or more classes. Further still, the method can comprise an act of generating an individual score associated with an individual record based the predictive model.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 4 illustrates an exemplary algorithm for generating a predictive model;

DETAILED DESCRIPTION

Figure 1:
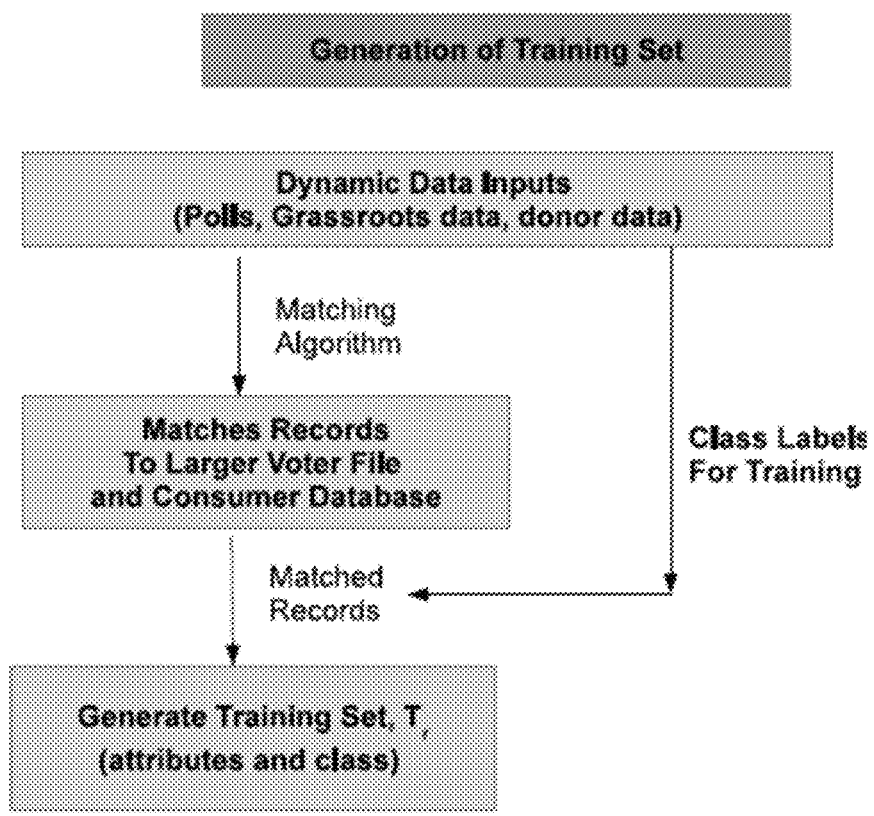
FIG. 1 illustrates a flowchart of a method for generating a training set in accordance with implementations of the present disclosure.

The present disclosure extends to systems, methods, and apparatuses configured to process and associate disparate data with potential human driven outcomes. In particular, implementations of the present disclosure provide significant benefits in modeling behaviors based upon processed data. For example, data can be associated with individuals, categorized, and scored. Implementations of the present disclosure provide for increased accuracy and speed in analyzing large and disparate data sources.

In at least one embodiment, a Campaign-specific Voter Score Algorithm (CVS Algorithm) can be used to generate voter scores. The CVS algorithm may comprise a data mining process that generates voter scores for every individual present in a large voter registration database. The CVS algorithm can provide a quantitative pulse of an individual voter's preference for a candidate over other candidates in a political campaign.

In most political data sets, such as a voter file, an individual's registered party is recorded. It has been argued that this itself may be sufficient to make a prediction on the preferred candidate. However, in reality, this is rarely the case. In fact, a prediction on a preferred candidate is anything but trivial. For example, in a race such as a primary election where people from the same political party compete in an election, it is impossible to predict an individual's preference for one of the candidates using merely the voter file's recording of an individual's party of registration.

Additionally, in many circumstances an individual's registered party may not be a true indicator of the individual's perceptions of a candidate. For example, Louisiana, has a large proportion of residents who are registered under one political party but in recent elections, they do not vote along party lines. On another note, one may also argue that a repeated number of survey polls are sufficient to depict the accurate mood of the electorate. However, even with statistically representative samples, the size of the samples is still too small to accurately pinpoint individual voter behavior and the overall election outcome predictions can be error-prone. In recent times, viewpoints have suggested that survey polls only provide broad-brush estimates and in most elections, individual voter scores can provide a microscopic view of the overall trend of the voting electorate. In all of the above scenarios, for accurate predictions, it is important to have an algorithm that captures a real-time pulse of the electorate quickly and efficiently.

Accordingly, at least one embodiment of the present disclosure can aggregate static and historical voter specific information with dynamic, real-time campaign specific information to generate rich, insightful data stores that in turn can be used for predictive modeling. The static, historical data points used in the innovation may include voter registration files, voting histories and consumer data sets. These data sets are typically available within a campaign. The dynamic, campaign-specific information may include aggregates of survey polls, data collected from phone calls, emails and past donations and support tags collected from door-to-door canvassing efforts. Data from all the myriad sources can be internally matched to an individual record in the voter file and the relevant attributes of individuals are aggregated.

These attributes for each individual can run into more than 300 columns of data with information specifics that include demographic markers, household information and past voting histories. Similarly, individual profiles from the dynamic pieces of information can be aggregated (from multiple surveys, door-to-door collected tags, email and phone contacts, donors) row-wise to develop a sample size that is 10-15 times larger than a typical survey sample size of 800. These aggregated, insightful individual profiles can then be used as training sets in the development and training of an automated, machine learning based predictive model. The predictive model can then generate/predict scores for every individual present in the voter file. The individual voter scores provide the following valuable information: among the candidates in an election campaign, which candidate is preferred over another.

The predictive models are dynamic and feedback-driven. As new inputs are received (such as a new survey poll or a newly collected data file by canvassing volunteers), the training set is revised and enhanced with the new information. The predictive model is run again to derive a new set of scores. In various embodiments, the predicted scores are valuable pieces of information. The individualized scores may facilitate targeted campaigns. They are useful in predicting how independent registered voters are likely to vote in an electoral campaign. They also help pinpoint accurate ground conditions in an electoral field. This enables campaigns to identify weaknesses and strengths and enables campaigns to recalibrate their campaign messaging and targeting.

The utility of the voter scores can be enhanced greatly when the campaign-specific scores can be integrated with data analytic tools. For example, many campaigns utilize a web-based data sifting and voter targeting tool that helps in filtering and dissecting through the massive voter registration database. The voter targeting tools can help campaigns generate data-driven, custom and targeted voter lists. The voter file database can have approximately 150-200 columns of attributes for each individual and for a large state like California comprise of an astounding 17 million records. Political campaigns use such analytical tools to filter down to specific groups so as to target them with campaign-specific messages.

Campaigns want the ability to mine the voter file, filter down to smaller targeted subsets and then use standard campaign outreach mechanisms such as emails, direct mail, phone calls and social media to reach potential voters. An example of one such campaign outreach could be: reaching independent voters in 2 Louisiana Parishes—Jefferson and St. Tammany—and those who are interested in Veterans Affairs. In such a scenario, a voter file analytics tool can help filter down to the 2 LA parishes, separate out independent voters and use the 'veterans' tag to identify who among them is likely to be interested in veterans related issues.

In an additional embodiment of the present disclosure, the analytics system can be integrated into a map-based application for use by ground-level campaigns representatives. For example, the map-based application can map out neighborhoods or a group of houses in an electoral precinct. The application can also integrate with the CVS algorithm generated voter scores and the voter file.

Using a respective voter score, the system can color code every home based on the overall political affiliation. A campaign volunteer can then use the color codes to provide targeted campaign messages pertinent to respective households. The integration of scores with this product can help identify households that are likely to support a candidate.

This can also enable campaigns to mobilize and energize households to vote on election day and hence drive up turnout percentages among campaign supporters.

Additionally, campaign volunteers can also use this map-based technology to conduct door-to-door short issue based surveys to gauge how that household views a particular election issue(s). This survey data can be collected and reported back to the campaign data warehouse for data enhancement and predictive model input. The scores derived from the model will hence be sensitive to an individual's viewpoint on the pertinent election issues.

In yet another embodiment of the present disclosure, the system can comprise user-facing systems that use map and chart-based visualizations to display past election results, turnout and performance statistics, and breakdowns of results and statistics by various demographic criteria. The tools can provide a geographical and quantitative assessment based on previous results.

In at least one embodiment, the predictive modeling and the generated voter scores using the CVS algorithm are provided as a data service and as an API to potential customers. Additionally, the system may also comprise a web-based dashboard that provides users with the ability view and manage the system. Additionally, embodiments of the disclosure may provide a data service that is a direct derivative of the voter scores. This data service may comprise the ability to estimate vote counts and shares many months prior to the actual election. The vote counts can be estimated at granular levels such as precincts. Estimating vote counts prior to election day provides an accurate sense of where a candidate is well-supported and where more work needs to done.

In at least one embodiment, the system can comprise an integrated web framework that is deployed within stand-alone virtualization containers. For example, the web framework may provide the foundation for a campaign-specific analytics dashboard. Each virtualization container can contain the list of products that a client or a campaign has subscribed for. Each container can also contain administrative consoles where accounts and logins can be created for any number of campaign staffers and volunteers. The web technologies to be used in this phase can include: Python, Django, Node.js, MongoDB, PostrgresSQL, Mapbox and R. Each of the products or apps in the virtual containers may be connected to the underlying data stores and modeled scores (from the CVS algorithm).

Turning now to an exemplary embodiment of the present disclosure, the above disclosed CVS algorithm may comprise a machine learning approach that generates voter scores for every individual present in a large voter registration database. The CVS algorithm can provide a quantitative indication of an individual voter's preference for a candidate over other candidates in a political campaign.

In at least one implementation, the CVS algorithm can access and process large dataset of available information. For example, in most political data sets, such as a voter file, an individual's registered party is recorded. Similarly, the CVS algorithm can access and processes any other data sources such as, but not limited to, polls, donation data, grass-roots and field-based information to generate real-time machine learning models. Resulting models can then be used to predict individualized voter scores for the entire electorate. The voter scores can then be used to predict vote counts under various voter turnout scenarios. Due to the dynamic input sources such as recent polls and input from grassroots data, the algorithm is sensitive and perceptive to even granular changes in perceptions of the electorate. This enables the CVS algorithm to be highly accurate in predicting vote counts and share percentages.

For example, consider a large voter file database $V_f$, that comprises "m" rows (voter file records) and "n" columns (attributes). Consider also an associated consumer database, C, containing behavioral attributes. Each row of C may be linked to the voter database, $V_f$, with a common voter id attribute, vid, which is a unique identifier. Databases $V_f$ and C will also be referred as 'static' pieces of information in this application, as they do not change often over time. Various other datasets may comprise so called 'dynamic' pieces of information (sources of data that are more prone to change) such as polls (referred to herein as "P"), data collected by political grassroots work (referred to herein as "G") and donation data (referred to herein as "D"). For the sake of clarity and explanation, an exemplary dataset will be used herein. The exemplary dataset may be associated with a poll, $P_i$, where i corresponds to a set of polls associated with the election and is in the range [1, p].

Apart from the above description, a variety of different variables and notations will be used. Table 1, below, describes several of the various variables.

TABLE 1

| | Notation summary of terms |
|---|---|
| p | number of polls conducted |
| P | set of polling data sets, P = $\{P_1, P_2, \ldots, P_p\}$, so $P_i$ corresponds to poll i and i ∈ [1, p] |
| g | the number of grassroots collected data sets |
| G | set of grassroots data sets collected, G = $\{G_1, G_2, \ldots, G_g\}$ |
| d | the number of donation data sets collected |
| D | set of donor data sets collected, D = $\{D_1, D_2, \ldots, D_d\}$ |
| DC | set representing dynamic pieces of information with DC = P∪G∪D |
| $T_r$ | derived training set for CVS algorithm |
| $T_e$ | derived test set |
| $c_1$ | label representing class 1 in $T_r$, if support is for candidate $c_1$ |
| $c_2$ | label representing class 2 in $T_r$, if support is for candidate $c_2$ |
| ScoreSet | set of Individual voter scores. It is a vector of the form 1 × n |
| classLabels | a vector, corresponding to labels assigned to $T_r$. |
| t | boundary threshold that separates the derived scores into 2 classes |
| $V_f$ | voter file, in the form of a matrix m × n, m rows and n attributes |
| $V_f$[id] | vector of the shape 1 × n, referencing the id column in $V_f$ |
| $V_f$[phonenum] | vector of the shape 1 × n, referencing the phone number column, phonenum in $V_f$ |
| $V_f$[gender] | vector of the shape 1 × n, referencing the gender column in $V_f$ |
| $V_f$[race] | vector of the shape 1 × n, referencing the race column in $V_f$ |
| $V_f$[age] | vector of the shape 1 × n, referencing the age column in $V_f$ |

At least one implementation of the present disclosure can use record linkage processes to generate a training data set $T_r$ that can then be used to train a machine learning model. FIG. 1 depicts a flow chart of a schema for generating a training set. In at least one implementation, building a training set may comprise developing individual records using dynamic information (from say a poll) and linking the information with the voter registration database, $V_f$ and the consumer set C.

For example, a polling survey, $P_i$ may comprise individual responses to survey questions and meta information such as the tuple comprising of age, gender, phone number, race and in rare cases a unique voter id. In at least one implementation, the data related to phonenum, race, age, and gender are sufficient to provide a high match rate with the large voter file $V_f$.

Using a rule-based record linkage method, a scan can be run for the same combination of phone number, race, age and gender in the more comprehensive and complete voter file, $V_f$. Once a match is found, and a unique voter id is found, columns from the voter file $V_f$ and the consumer file C are combined and the resulting attributes are appended to the training set $T_r$.

A class attribute can then be associated with the matched individual. For example, survey questions typically include questions about a campaign and an individual's preference for a candidate. The key survey question is often referred as a 'ballot' question—where survey respondents are asked what their preference is for a candidate. Responses to this question may form the basis for the class attribute in the training set $T_r$. For the sake of simplicity and for developing the classification framework as a 2-class problem, the 'ballot' survey question with multiple candidates (>2) can be reduced to considering only the top 2 candidates or the candidates are grouped into the 2 most dominant parties (such as Republican and Democratic in the US political system).

Depending on what the response is to the 'ballot' question, an appropriate class label is assigned to the matched record. For example, in a 2-candidate scenario, if the survey response is in favor of candidate $c_1$, then a class label of $c_1$ is assigned to the matched record and if the survey response is in favor of candidate $c_2$, then a class label of $c_2$ is assigned. This process of class labeling can be repeated for all the matched records, until all matched records are exhausted. The procedure, explained above, can also be applied to additional polling data (other surveys), grassroots collected data and other miscellaneous sources such as donation data.

In at least one implementation of the present disclosure, the derived training set can be used to develop a classification model. For example, classification techniques such as Random Forest and Support Vector Machines can be used to develop a predictive model, $M_0$. In at least one implementation, a 10-fold cross validation can be applied to ensure there are no biases in the fitted model. The test data set, $T_e$, is derived from the entire voter file, $V_f$. The test data set may be unlabelled. The attributes for the test data set, $T_e$, can be derived similar to the training set, $T_r$, by combining the attribute columns associated with $V_f$ and consumer file C.

Figure 2:
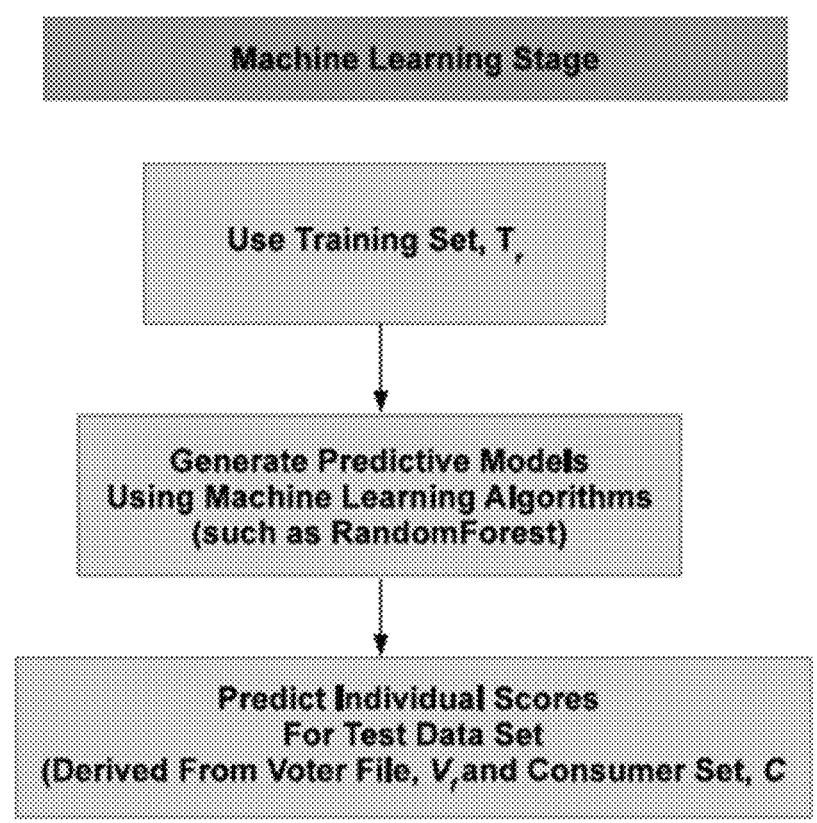
FIG. 2 illustrates a flowchart of a method for a machine learning stage in accordance with implementations of the present disclosure.

Using the predictive model $M_0$, class labels and associated probabilities can be predicted for the test data set $T_e$. An exemplary method for calculating the scores is depicted below in TABLE 2 and is symbolically depicted in FIG. 2.

TABLE 2

Require: $V_f$ and C (static components) and dynamic component set DC = {P, G, D}.

1: Initialize array MatchedIds = $\phi$
2: Initialize array classLabels = $\phi$
3: for each dataset dc in DC do
4:     for each row iterator r in dc do
5:         Find $V_f$[id] such that $V_f$[phonenum] = r[phonenum] and $V_f$[gender] = r[gender] and $V_f$[race] = r[race]
6:         if $V_f$[id] is found then
7:             MatchedIds = MatchedIds + $V_f$[id]
8:             classLabels = classLabels + Label ($c_1$ or $c_2$) {based on response question in dataset}
9:         end if
10:     end for
11: end for
12: Initialize matrix $T_r$ = $\phi$ TABLE 2-continued Require: $V_f$ and C (static components) and dynamic component set DC = {P, G, D}.

13: for each id in MatchedIds do
14:     $T_r$ = $T_r$ + ($V_f$[id] + C[id]) {matrices $V_f$ and C are collated column-wise, matrix $T_r$ is appended row-wise}
15: end for
16: Append classLabels vector to $T_r$.
17: Train a Classification Algorithm ML using $T_r$ to get fitted model $M_0$
18: Generate unlabeled, test data $T_s$, by column-wise collation of matrices $V_f$ and C.
19: Use Model $M_0$ on test data set $T_e$ to predict probabilistic scores ScoreSet.
20: return ScoreSet.
21: Repeat algorithm (steps 1-20) as new time-relevant datasets (such as new polls, grassroots data, updated donor files etc) are added in the set - DC In at least one implementation, the voter scores that are output as ScoreSet lie in the range of [0, 1]. Supporters of candidate $c_1$ will have voter scores that lie in the range of [0, t] and supporters of candidate $c_2$ will lie in the range of [t+0.01, 1]. In an ideal case, the threshold t that forms the boundary between the 2 classes, $c_1$ and $c_2$, will be equal to 0.5—the halfway point between 0 and 1. However, since political campaigns vary across regions and demographics, an empirical method is proposed to identify the boundary threshold, t.

In at least one implementation, identifying the boundary threshold t can comprise identify, within the set of polling data sets P, records that marked the ballot question in the poll as 'undecided'. These records can then be matched with larger voter file $V_f$ and the associated id of individuals are found. Using the generated scores, ScoreSet, the scores of the 'undecided' individuals can the be determined. The median of these undecided scores can form the boundary threshold t.

Figure 3:
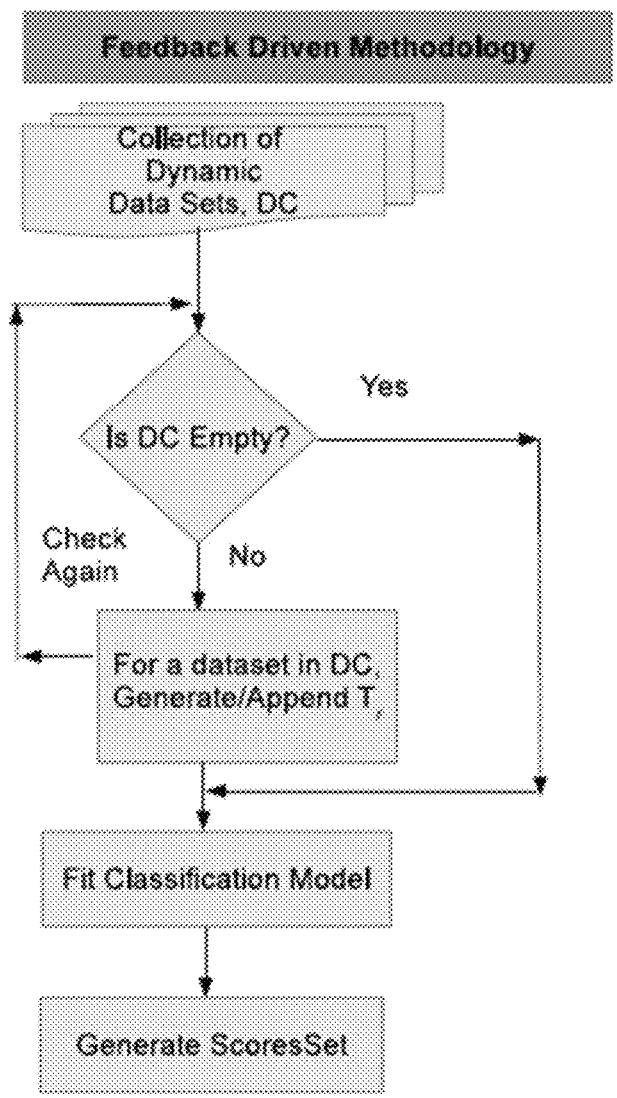
FIG. 3 illustrates a flowchart for a feedback drive model generation according to an embodiment of the present disclosure.

In at least one implementation, as shown in FIG. 3, the CVS algorithm can comprise a feedback-driven methodology where the scores are constantly refreshed as new data is collected. For example, during the course of a lively, election campaign. Using the notation outlined above, the dynamic data store DC will be frequently refreshed or appended during the course of a campaign.

Each data set in the data store DC can then be used for the matching or record linking process where each record in a data set is matched to the voter file and an associated id is identified. Once all the datasets in DC are exhausted and training set $T_r$ is generated, then machine learning models can be fitted and scores are generated. Since the dataset store DC is frequently updated with newly collected campaign data and resonates with the ground-level, real-time conditions of an electorate, the generated machine learning models and the subsequent voter scores provide a real-time, granular pulse. Due to the process of aggregating the training set, $T_r$, provides the machine learning model with a large set of examples to learn from. This is a significant advantage from using solely polling data since polls typically have small sample sizes and extrapolating this small-sized information to a larger voter file, can lead to larger predictive errors.

Accordingly, implementations of the present disclosure provide significant benefits in modeling behaviors based upon processed data. For example, data can be associated with individuals, categorized, and scored. Implementations of the present disclosure provide for increased accuracy and speed in analyzing large and disparate data sources.

The CVS algorithm and scores derived from it have two significant applications. One application is the prediction of vote counts under various turnout scenarios and the other is voter file segmentation and the potential of focused micro-targeting.

One of the important components in an election is the ability for campaigns to estimate potential vote shares and counts prior to the actual election. This prior estimation enables the campaign to allocate campaign resources based on campaign strengths and weaknesses. So, for example, if a campaign is faring poorly in a county or region or among a certain demographic of the electorate, campaign staff can increase their campaign resources and messaging to counter that weakness. Accurate estimation of vote counts prior to the election also help campaigns differentiate between 'certain win' regions from 'certain loss' regions. An estimation of vote count also helps bridge the gap in potentially likely 'narrow loss' scenarios and consolidate likely 'narrow win' scenarios.

Estimating vote counts becomes non-trivial as voter turnout percentages can be unpredictable and can vary. Hence, campaigns have to estimate under varying turnout scenarios. Using scores derived from the CVS algorithm, one can estimate expected vote counts under different turnout percentages, yielding a wide range of scenarios. For a given turnout percentage, say tp %, a random sample of size tp %×|Vf| is drawn from the voter file Vf. The associated CVS derived scores for this sample are tabulated as follows. For each record, if the associated CVS score is greater than the boundary threshold t, then that record is tallied as a vote for candidate c1 and if the score is less than or equal to the boundary threshold t, then it is counted as a vote for candidate c2. This rule is repeated for all the records in the random sample and the tally counts for c1 and c2 are aggregated to get vote counts for each candidate.

One other application of scores is the ability to segment and filter a large voter file into smaller, targeted segments for effective micro-targeting during a political campaign. To accomplish a campaign-driven goal such as political messaging to a certain demographic within a certain geographical area, a subset of voters matching that profile can be identified and then CVS scores can be used to identify who are the most likely supporters within that subset.

The CVS algorithm was tested during three live election campaigns. The first two elections were the 2014 primary and runoff elections for the US Senate Election in Louisiana. The other election was the Louisiana Governor's election in 2015. The CVS algorithm was used to generate scores for approximately 3 million individual records in the Louisiana voter file. The scores were first applied to predict the early vote outcomes, soon after the early voting period ended. Typically, early voting period lasts about 6 days and about a week or more before the actual election day. Table 3 compares the CVS model predicted early vote results with the actual results for both the primary and runoff elections for Louisiana's US Senate election of 2014. In the primary election, the model predicted a republican vote share of 52.3% (and a democratic vote share of 47.7%). The actual early voting result for the Republican vote share, declared a week after early voting had been completed and after the CVS model had predicted, was 52.8%. The predicted result was a mere 0.5% off the actual result. In the runoff election, the model predicted result was off by a mere 1.6%.

Table 4 compares the performance of the CVS Model with the Actual Election Result for the 2014 Louisiana's US Senate Runoff Election and an analysis conducted by the nationally renowned prediction blog http://fivethirtyeight.com. By this metric, the CVS Model prediction of the result (predicted a day before the actual election) was a mere 0.2% from the actual result. On the other hand, the fivethirtyeight blog analysis was off by 1.9%.

The CVS model was also applied prior to the runoff election of the 2015 Louisiana Governor's race. Table 5 provides model derived vote share estimates (model run three weeks prior to the actual election). The table shows that the model was off from the actual result by a mere 0.9%.

In summary, Tables 3, 4, and 5 provide strong evidence of the accuracy of the CVS model derived predictions under live election scenarios.

TABLE 3

Early Vote Predictions Using CVS Algorithm During the 2014 US Senator election in Louisiana

| Election | Model Predicted | Actual Result |
|---|---|---|
| Primary (Republican Party Vote Share) | 52.3% | 52.8% |
| Runoff (Republican Party Vote Share) | 57.3% | 58.9% |

TABLE 4

Model Predictions Vs. Actual Results (2014 US Senator Runoff Election)

| Election | Republican | Democratic | Difference From Actual Result |
|---|---|---|---|
| 538 Analysis (Dec. 5, 2014) | 57.8% | 42.2% | 1.9% |
| CVS Model Predicted (Dec. 5, 2104) | 56.1% | 43.9% | 0.2% |
| Actual Result | 55.9% | 44.1% | — |

TABLE 5

Model Predictions Vs. Actual Results (2015 Louisiana Governor's Runoff Election)

| Election | Republican | Democratic | Difference From Actual Result |
|---|---|---|---|
| CVS Model Predicted (Nov. 6, 2105) | 44.8% | 55.2% | 0.9% |
| Actual Result | 43.9% | 56.1% | — |

In another embodiment, the problem of accurately predicting vote counts in elections is considered. Typically, small-sample polls are used to estimate or predict election outcomes. In some embodiments, a machine-learning hybrid approach is used. This approach utilizes multiple sets of static data sources, such as voter registration data, and dynamic data sources, such as polls and donor data, to develop individualized voter scores for each member of the population. These voter scores are used to estimate expected vote counts under different turnout scenarios. This technique has been tested with data collected during U.S. Senate and Louisiana gubernatorial elections. The predicted results (expected vote counts, predicted several days before the actual election) were accurate within 1%. It should be appreciated that the same or similar approach can be applied to other voting situations with similar accuracy.

ADDITIONAL DETAILED DESCRIPTION

Introduction

The problem of accurately predicting vote counts in elections is considered in this disclosure. Typically, small-sample polls are used to estimate or predict election outcomes. In this study, a machine-learning hybrid approach is proposed. This approach utilizes multiple sets of static data sources, such as voter registration data, and dynamic data sources, such as polls and donor data, to develop individualized voter scores for each member of the population. These voter scores are used to estimate expected vote counts under different turnout scenarios. The proposed technique has been tested with data collected during U.S. Senate and Louisiana gubernatorial elections. The predicted results (expected vote counts, predicted several days before the actual election) were accurate within 1%.

The present disclosure introduces a machine learning approaches to predicting vote counts and vote shares in political elections. For example, the Campaign-Specific Voter Score Algorithm (CVS Algorithm) and individualized voter scores for every individual present in a large voter registration database can be used. The CVS algorithm provides a quantitative representation of an individual voter's preference for a candidate over other candidates in a political campaign.

Often in most political data sets, such as a voter file, an individual's registered party is recorded. One might think that this is sufficient information to make a prediction on the preferred candidate. In reality, a prediction on a preferred candidate is anything but trivial. For example, in a primary election where people from the same political party compete to earn their party's nomination for the general election, it is improbable to predict an individual's preference for one of the candidates using only the individual's party of registration. In addition, an individual's registered party is often not a true indicator of their perceptions of a candidate. For example, the state of Louisiana has a large proportion of residents who are registered as Democrats, but who tend to vote for Republicans.

One may also argue that a repeated number of survey polls are sufficient to depict the accurate mood of the electorate. However, even with statistically representative samples, the sample size is too small to accurately pinpoint individual voter behavior and the overall election outcome predictions can consequently be error prone. In the FiveThirtyEight blog soon after the results of the 2014 midterm elections and the 2016 elections, bloggers such as Nate Silver, Carl Bialik, Harry Enten, and Dhurmil Mehta describe and document skews in small sample polls yielding wrong expectations of election outcomes, underscoring the weakness in sample polls as predictive of election outcomes when used alone.

The inadequacy of polls in forecasting elections is widely recognized. Previous academic research has documented that survey polls only provide broad-brush estimates but that, in most elections, individual voter scores can provide a more microscopic view of the electorate. Some research considers a data science arms race within political campaigns where there is widespread usage of traditional statistical techniques such as ordinary least squares and logistic regression, but there is also an understanding that these methods are both too dependent on the skill of the analyst and may not apply to different regions, issues, or campaigns. This has led to an increased interest in supervised learning but, as of now, limited to no adoption within political campaigns.

There is another problem with just using surveys for predicting election outcomes. For example, there are problems associated with surveys such as misreporting by respondents. This can lead to poor turnout model estimations and erroneous election outcome scenarios. It may be possible to combine data analytics and social media to maximize marketing and messaging of candidates and their stances during live election campaigns, though its predictive capacity has yet to be proven.

More recent elections, such as the U.S. Presidential Election in 2016, highlight the failure of survey-based polls in predicting the correct outcome. Most polls wrongly predicted that Hillary Clinton would win the U.S. Presidential election—but Trump won. Recent work has called polling an "imperfect science" and lists scenarios where random sampling (and small samples) can introduce biases that lead to inaccurate predictions. Possibilities cited for wrong predictions in the 2016 election include an underrepresentation of true Trump supporters in polling samples and respondents being reluctant to make a decision for whom they plan to vote.

Since relying solely on polls can lead to inaccurate predictions, embodiments disclosed herein disclose an algorithm that relies not only on polls but also on other disparate sources of dynamic campaign data that capture a real-time pulse of the electorate. By doing so, the proposed method can collect signals from a wide swath of the voting electorate and thereby generate accurate predictions. In some embodiments, accurate predictions can be obtained using a technique that combines static pieces of information with dynamic campaign information to generate real-time machine learning models. Static pieces include data such as voter registration data, optional consumer data sets (that describe at a household level behavioral consumer habits such as buying or spending habits, hobbies, and recreational interests), and demographic attributes associated with an individual or household. Dynamic pieces of information include data such as polls, donation data, grassroots surveys, and field-based information. The real-time predictive models generated are then used to predict individualized voter scores for the entire electorate. These scores are used to predict vote counts, which can be adapted to model various voter turnout scenarios. Due to the dynamic input from recent polls and grassroots data, the algorithm is sensitive to minute changes in perceptions of the electorate. This enables the CVS algorithm to be highly accurate in predicting vote counts and percentages.

Related Work

While political data analytics is not a new field, it has grown substantially over the past 10 years. This growth is primarily a result of two factors. First, there has been a substantial decrease in the cost of computing power and maintaining databases. Most political campaigns have binding time and budget constraints, so the cost of procuring data and developing sophisticated analyses is no longer as prohibitive as in the past. National political parties now maintain detailed databases with behavioral, commercial, and political characteristics of voters. Instead of constructing and extending their own databases, political candidates are able to use existing data resources for targeting and outreach efforts.

The second factor is a recent increase in political consultants with backgrounds in fields such as computer science, data science, and statistics. In the past, most political consultants had backgrounds in law or the humanities. A lack of human capital at the intersection of politics and more quantitatively inclined fields limited the availability of sophisticated data-driven computational and statistical methods. This lack of human capital was compounded by a disinterest among many campaign managers and candidates who did not see the utility in a computational approach. This viewpoint has changed, in large part due to the high profile presidential campaigns by President Barack Obama in 2012 and Senator Ted Cruz in 2016, both of which relied heavily on data analytics to guide their campaigns.

Recent work at the intersection of machine learning and social data includes sentiment analysis of candidates' perceptions and mining Facebook pages to predict political affiliation of a Facebook user. Additional work in this area includes creation of a voting recommendation tool that matches voter preferences and positions of political parties and candidates.

One of the primary goals of political data analytics is to develop individualized scores for voters. These scores usually range from 0 to 1 and predict the likelihood of a voter supporting a particular candidate. These scores are typically derived using common statistical methods, such as multivariate regression. Such methods have some drawbacks. They assume that the variables or attributes conform to a simplistic distribution (in most cases, normal distribution) or assume linear dependencies. These problems guided the exploration of the proposed machine learning approach. The proposed methodology does not make such assumptions and applies machine learning techniques that do not assume an underlying distribution. Machine learning approaches have been used in a live election environment to derive decision or action rules. One of the many distinctions between embodiments disclosed herein this work and earlier machine learning research is that embodiments disclosed herein provide a more comprehensive framework that predicts which candidate an individual is likely to support or not support. Although prior work has implemented data mining techniques and scores, the data-driven aspects were limited to isolated portions of the campaign and not an integral part of a campaign operation.

The description of these data-driven campaigns is based on interviews conducted with campaign staff and not a general purpose algorithmic methodology. Embodiments provided herein include a generic, theoretical algorithmic framework that provides a basis for integration into many aspects of a campaign and which are applicable to a wide spectrum of political campaigns.

In some embodiments, an important feature includes combining combine static and historical voter specific information with dynamic, real-time campaign specific information to generate rich insightful data stores that can be used for predictive modeling. The static historical data points used in some models include voter registration files, voting histories, and consumer data sets. Such static data sets are typically available within a political campaign or accessible to a campaign via their state or national party. Some private data vendors, such as Catalyst LLC, have created national voter registration data. These vendors extend these baseline files with elaborate census data information and data on the consumer habits of the voter. This regularly updated voter database is then sold to a national party (in this case, the Democratic Party). On the Republican Party side, there are similar firms that sell similar voter data sets. The national or state party officials then make the data sets available to their party candidate or campaign. Some campaigns use such extensive data profiles on voters in an effort to create accurate, current voter contact information. Some campaigns supplement the voter registration information and consumer data with their own voter contacts based on past supporters and donors from previous campaigns.

In some instances, it may be important to address privacy concerns with the use of such data sets. There can be voter privacy issues as different data sets are aggregated, and individuals may object to the use of their data in forecasting their behavior. The disclosed CVS algorithm, among other predictive embodiments disclosed herein, can meet many voter privacy standards as they act to identify likely supporters. Embodiments disclosed herein do not directly change the role of a typical political campaign to persuade or the individual's right to vote or not to vote. Instead, embodiments disclosed herein enable a more accurate predictive model of election outcomes. This can be enabled, for example, through implementation of a combined order of specific rules that render information, such as the static and dynamic data sets, into a specific format that is then used to create the desired result of increased predictive power of election outcomes over what is known or enabled by current methods and systems. That is, embodiments of the present disclosure disclose specific ways to solve the problem of predicting election outcomes, and as described below, such embodiments allow for significantly increased predictive capacity.

Additionally, there may be issues with the use of such data sets in generating downstream consumer data, as it may be harmful when value is destroyed (not created) for a stakeholder, when uses result in diminished rights (instead of realization of rights) for a stakeholder, and/or it results in disrespectful treatment of a consumer. None of the harmful use cases apply to embodiments disclosed herein. The sources for these data are discussed in detail below.

This work used a voter data set and a consumer data set that was made available to the campaigns by the national Republican Party (a downstream use). However, in the development of the predictive model, the use of the consumer data set was optional for two reasons. First, consumer information is typically available at a generic household level and not at an individual level. An example of this is a field "hunting_fishing" that described using a boolean value to indicate an interest of someone in the household for hunting or fishing. Another reason for the use of consumer data to be optional is that the data can be sparse with several column attributes having no information. In the proposed methodology, the voter registration data were more dense and were sufficient to meet the need as a static data source and to obtain a highly accurate predictive model along with the dynamic data sources.

However, using only static data sets such as the ones described above, one cannot get real-time predictive insights. This is where dynamic information sources and data sets come into play (Recent work such as Nickerson and Rogers[5] describes a similar need and the dynamic data sources that campaigns use to get real-time insights). This dynamic, campaign-specific information includes aggregates of survey polls, data collected from phone calls, emails, and past donations, and support tags collected from door-to-door canvassing efforts. Data are internally matched to an individual record in the voter file, and the relevant attributes of individuals are aggregated. Attribute counts can exceed 300 columns of data with demographic markers, household information, and past voting histories included. Similarly, individual profiles from the dynamic pieces of information (from multiple surveys, door-to-door collected tags, email and phone contacts, and donors) are aggregated row-wise to develop a sample size that is 10-15 times larger than a typical survey sample size of 800. These aggregated profiles can be used as training sets in the development of an automated, machine learning predictive model.

The predictive models are dynamic and feedback driven. A political campaign has the ability to collect new pieces of information such as a new survey poll or a daily log of grassroots information collected by canvassing volunteers. These new information inputs are processed by revising the training set and rerunning the predictive model. The predictive models can be dynamically updated with the new information and a new set of revised scores can be generated.

The predicted scores are valuable pieces of information. The individualized scores facilitate the creation of targeted campaigns. The scores are useful in predicting how independent registered voters are likely to vote in an electoral campaign. The scores also help pinpoint accurate ground conditions in an electoral field. This information enables campaigns to identify strengths and weaknesses and enables campaigns to recalibrate their campaign messaging and targeting. In the next section, a theoretical algorithmic framework that predicts individualized scores is developed to provide quantitative insights on whether an individual is likely to support a candidate or not.

The uniqueness of this method is the dynamic generation of model scores based on any new campaign specific data inputs such as polling data or tags collected from canvassing efforts. The model can be run with each new set of inputs, and scores can be generated within a few minutes.

Problem Description

Formal Notation

As an example, consider a large voter file database $V_f$ that comprises m rows (voter file records) and n columns (attributes) (size of m varies from 3 to 190 million rows and number of columns ranges from 250 to 300). This setup typically falls under the Big Data domain. Optionally, also consider an associated consumer database C (containing behavioral attributes), each row of which is linked to the voter database $V_f$ with a unique household id attribute hid. Databases $V_f$ and C will also be referred as "static" pieces of information in this work, as they do not change often over time.

Also consider dynamic pieces of information (sources of data that are more prone to change) such as polls (referred to as P), data collected by political grassroots work (referred to as G), and donation data (referred to as D). For the sake of clarity and explanation, an exemplary dataset will be used herein. The exemplary dataset may be associated with a poll, $P_i$, where i corresponds to a set of polls associated with the election and is in the range [1, p].

Apart from the above description, a variety of different variables and notations will be used. Table 6, below, describes several of the various variables.

TABLE 6

Notation summary of terms

| | |
|---|---|
| p | number of polls conducted |
| P | set of polling data sets, $P = \{P_1, P_2, \ldots, P_p\}$, so $P_i$ corresponds to poll i and $i \in [1, p]$ |
| g | the number of grassroots collected data sets |
| G | set of grassroots data sets collected, $G = \{G_1, G_2, \ldots, G_g\}$, so $G_i$ corresponds to poll i and $i \in [1, g]$ |
| d | the number of donation data sets collected |
| D | set of donor data sets collected, $D = \{D_1, D_2, \ldots, D_d\}$, so $D_i$ corresponds to poll i and $i \in [1, d]$ |

TABLE 6-continued

Notation summary of terms

| | |
|---|---|
| DC | set representing dynamic pieces of information with DC = P∪G∪D |
| $T_r$ | derived training set for CVS algorithm |
| $T_e$ | derived test set |
| $c_1$ | label representing class 1 in $T_r$ if support is for candidate $c_1$ |
| $c_2$ | label representing class 2 in $T_r$ if support is for candidate $c_2$ |
| ScoreSet | set of Individual voter scores. It is a vector of the form 1 × n |
| classLabels | a vector, corresponding to labels assigned to $T_r$ |
| t | boundary threshold that separates the derived scores into two classes |
| $V_f$ | voter file, in the form of a matrix m × n, m rows and n attributes |
| $V_f$[id] | vector of the shape 1 × n, referencing the id column in $V_f$ |
| $V_f$[phonenum] | vector of the shape 1 × n, referencing the phone number column, phonenum in $V_f$ |
| $V_f$[gender] | vector of the shape 1 × n, referencing the gender column, gender in $V_f$ |
| $V_f$[race] | vector of the shape 1 × n, referencing the race column, race in $V_f$ |
| $V_f$[age] | vector of the shape 1 × n, referencing the age column, age in $V_f$ |
| $M_0$ | predictive model that classifies individuals into $c_1$ and $c_2$ |
| tp % | projected turnout percentage, used for estimating election vote counts |

Matching Records (Record Linkage)

In one embodiment, the first step uses record linkages to generate a data set $T_r$ that can be used to train a machine learning model. Record linkage is essentially the linking of information from two or more data sources (databases) to define a single entity (in this case, a single individual). This linking operation in big data sets can be computationally complex due to the absence of a unique identifier information (such as a national identification number or a social security number in the United States). Record linkage finds applications in diverse fields such as healthcare, business, and government agencies. Record linkage also helps in the removal of duplicate entries. It can help save money in political campaigns such as removing of duplicate mailing addresses during a targeted mail operation. There exists an extensive survey on the use of machine learning, rule-based and similarity metric-based techniques to identify duplicate records. In this disclosure, linking of information across multiple data sources to a single individual can be useful in deriving unique individual profiles for training machine learning models. A schema for generating the training set is depicted in FIG. 1. In one embodiment, building a training set can include developing individual records using dynamic information (from say a poll) and linking the information with the voter registration database, $V_f$, and the consumer set, C.

As an example, consider a dynamic data set such as a polling survey, $P_i$. Raw polling data may include a number of individual responses to survey questions and meta information such as the tuple containing age, gender, phone number, race, and, in rare cases, a unique voter id. After several small pilot studies, it was found that in this embodiment, the attribute columns of phonenum, race, age, and gender were sufficient to provide a high match rate with the large voter file $V_f$. Using a rule-based record linkage method, a scan is run for the same combination of phone number, race, age, and gender in the more comprehensive and complete voter file, $V_f$. Once a match and a unique voter id are found, columns from the voter file $V_f$ and the consumer file C are combined, and the resulting attributes are appended to the training set $T_r$.

Based on the foregoing, the next piece of information identified can be the class attribute of the matched individual. Surveys typically include questions about a campaign and an individual's preference for a candidate. The key survey question is often referred to as a "ballot" question; survey respondents are asked which candidate they are most likely to support. Responses to this question form the class attribute in the training set $T_r$. For the sake of simplicity and for developing the classification framework as a two-class problem, the "ballot" survey question with multiple candidates (>2) can be reduced to considering either the top two candidates or the two most dominant parties (such as Republican and Democratic in the U.S. political system). Depending on the response to the "ballot" question, an appropriate class label can be assigned to the matched record (so in a two-candidate scenario, if the survey response is in favor of candidate $c_1$, then a class label of $c_1$ is assigned to the matched record, and if the survey response is in favor of candidate $c_2$, then a class label of $c_2$ is assigned). This process of class labeling is repeated for all the matched records until all matched records are exhausted. The procedure can also be applied to additional polling data, grassroots collected data, and other miscellaneous sources such as donation data.

CVS Algorithm and Voter Scores

With continuing reference to the foregoing embodiment, a next step in the process can be to use the derived training set to develop a classification model. Classification techniques such as Random Forest and Support Vector Machines can be used to develop a predictive model, $M_0$. In some instances, a 10-fold cross validation is applied to ensure that there are no biases in the fitted model. The test data set $T_e$ is derived from the entire voter file $V_f$. The test data set can be initially unlabeled. The attributes for the test data set $T_e$ may be derived similar to the training set $T_r$ by combining the attribute columns associated with $V_f$ and consumer file C. Using the predictive model $M_0$, class labels and associated probabilities are predicted for the test data set $T_e$. The schema of generating individualized voter scores is outlined as FIG. 2. An exemplary algorithm is outlined in FIG. 4.

The voter scores are outputted as ScoreSet and lie in the range of [0, 1]. Supporters of candidate $c_1$ will have voter scores that lie in the range of [0, t] and supporters of candidate $c_2$ will lie in the range of (t, 1].

In an ideal case, the threshold t that forms the boundary between the two classes will be equal to 0.5—the halfway point between 0 and 1. However, since political campaigns vary across regions and demographics, an empirical method is needed to identify the boundary threshold t. In some embodiments, the boundary threshold can be determined by identifying records that marked the ballot question in the poll as "undecided" within the set of polling data sets P. Those records can then be matched with larger voter file $V_f$, and using the CVS ScoreSet, the scores of the "undecided" individuals can be determined. In some embodiments, the median of those scores forms the boundary threshold t, though in other embodiments, it may be a mean of the scores or similar.

Feedback Driven and Real-Time Models

In some embodiments, the CVS algorithm is a feedback-driven methodology where scores are constantly refreshed as new data are collected, which is typical during the course of an election campaign. Using the notation outlined, the dynamic data store DC can be refreshed or appended frequently. Each data set in the data store DC is used for matching or record linking. Once all the data sets in DC are exhausted and training set $T_r$ is generated, machine learning models are fitted, and scores are generated. Since the data set store DC is frequently updated with newly collected campaign data the generated machine learning models and the subsequent voter scores provide a real-time granular pulse of the electorate. The process of aggregating the training set $T_r$ provides the machine learning model with a large set of training examples. This is a significant advantage over solely using polling data since polls typically have small sample sizes and extrapolating this small-sized information to a larger voter file can lead to larger predictive errors. An exemplary illustration of this feedback-driven model generation is depicted in FIG. 3.

Explanation on the Real-Time Models

During the 2014 election campaign for the U.S. senate in Louisiana and the 2015 election campaign for the Louisiana governor's race, this predictive technology was tested in a live election environment. The focus was on Louisiana due to the campaign based in Louisiana and the consequent availability of data catered to that political jurisdiction. Both campaigns had access to two static data sets from the Republic National Party—one was voter registration data (~2,930,000 rows and 168 columns) and the other a consumer data set (~1,930,000 rows and 90 columns). To build the dynamic data sets, the 2014 senate campaign would collect grassroots data from a host of volunteers spread across the state of Louisiana. The volunteers would go door-to-door in neighborhoods, knock on each household, and conduct a campaign-specific survey if permitted by the household owner. The data would come back on a daily basis in comma-separated text files. A series of record linkage procedures were applied to match individual voter responses back to voter file to gauge voter perceptions on the candidate. A success match rate of nearly 99% was achieved on the data that were collected by the door-to-door volunteers. The greater the response rate of the surveyed households, the richer the training set became for the machine learning model.

At the same time, on a weekly basis, the campaign would receive polling results from a contracted pollster. Although the polling data contained merely phone numbers and the individual responses to questions, using record linkage procedures, the authors could match the survey respondents to the voter and consumer data bases. The success rate for matching a poll response to an individual voter was nearly 94% (this is similar to that reported in this technical report). On a daily basis, the campaign would also receive phone-based voter contact information where voters would respond on whom they plan to vote for and their positions on various issues that matter to them. This information was also collected and matched to the static data sources and appended to the training data set. As new inputs came into the campaign in the form of phone contacts, door-to-door grass-roots efforts or polling information on a periodic basis (daily, weekly, or sub-daily when closer to election day), the model is retrained using constantly refreshed training data. While the data sets were limited to Louisiana, the algorithmic framework outlined in this work is a generic procedure that is applicable to many election campaigns that have access to data sets, such as those described above.

Figure 5:
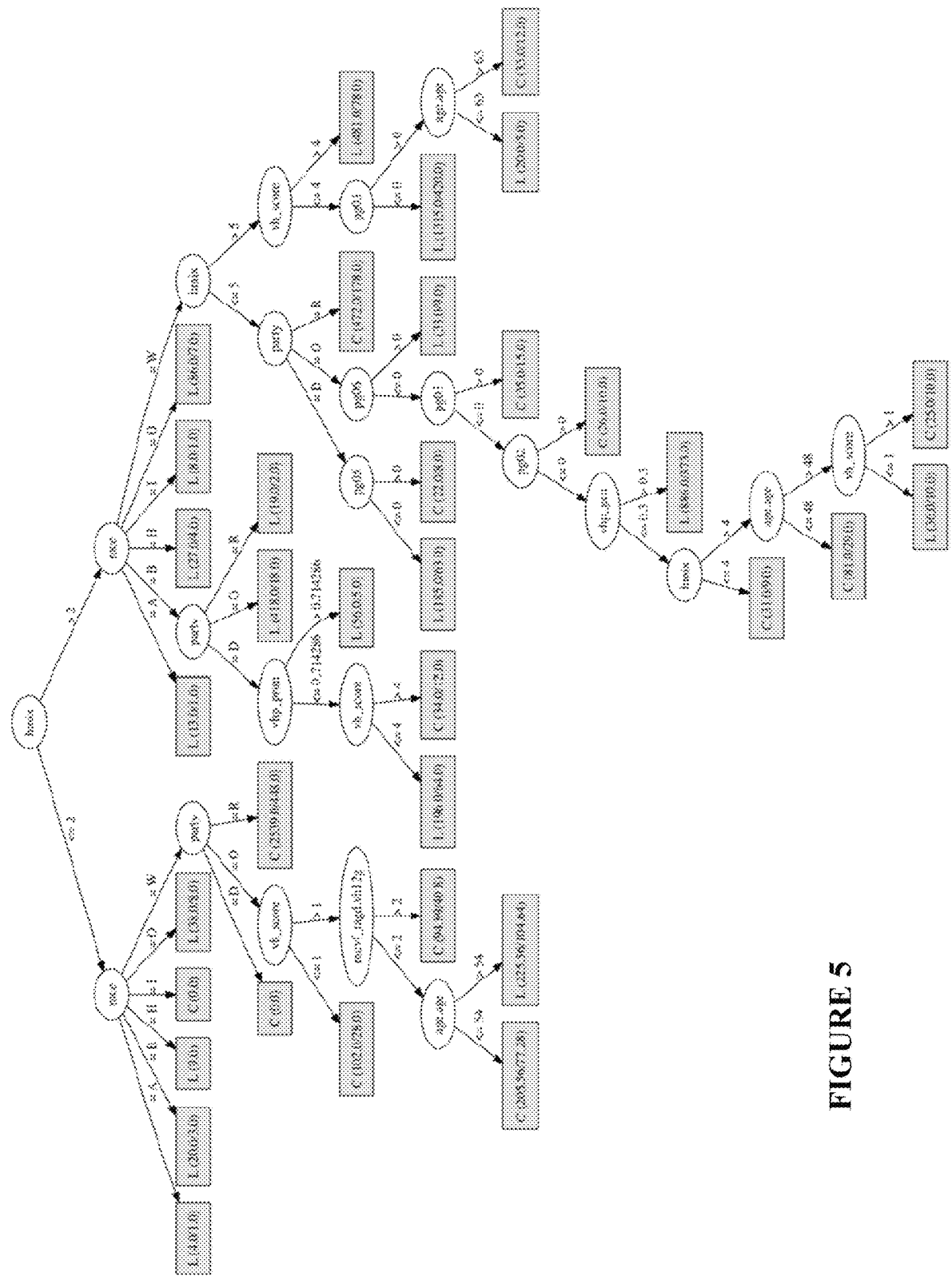
FIG. 5 illustrates an exemplary sample decision tree model using Random Forest construction.

Some notable predictive aspects of the disclosed models are described below. For example, an exemplary key variable that emerged was a variable called household mix (hmix). The household mix defines a political partisan mix within each household. As an example, if a household had four members with three members registered as Republican and one member registered as an independent, the model predicted the independent member as leaning Republican. In some embodiments, members of a household tend toward the majority view to avoid unpleasant within-household political disputes. Other exemplary defining variables include age, race, gender, and voter scores based on participation in previous elections. A sample decision tree model of one such tree constructed using Random Forest construction is depicted in FIG. 5. One can see from the tree that the first decision split happens with the hmix variable, followed by race and the party of registration. Each of the nodes in the decision tree (rectangular boxes) indicates the first initial of the candidate names. Using such a decision model, the proposed framework derives predictive scores on each individual voter.

Table 7, below provides a listing of some important predictor variables in the generation of the model. Important variables are household mix (hmix), the party of registration, the congressional district that a voter belongs to, the race of the individual, and series of indices that indicate voting in recent elections (for example, vh12g is a boolean variable with a value of 1 if they voted in the 2012 U.S. Presidential election and 0 if they did not). Notice that these predictor variables are not generic to one area (or Louisiana—the location used for this study), but can scale to any national or international election campaign. The CVS model predicted the correct voting result on all three live elections and was highly accurate in predicting actual vote shares.

TABLE 7

Exemplary decision variables

| Variable | Description | Mean Gini index score |
|---|---|---|
| hmix | Household mix | 838.3 |
| Party | Party of Registration | 708.9 |
| Cd | Congressional District | 319.7 |
| Race | Race | 233.7 |
| vh_score | Voting history score (or how many times has someone voted) | 188.4 |
| vh12g | Voted in 2012 (or previous) General Election (0 or 1)? | 143.4 |
| vh11g | Voted in 2011 (or second previous) General Election (0 or 1)? | 37.3 |
| sex | Gender/Sex | 130.8 |
| vh08g | Voted in 2008 (or previous Presidential election) (0 or 1)? | 124.2 |

Applications

The CVS algorithm and its scores have at least two significant applications. One application is the prediction of vote counts under various turnout scenarios, and another is for campaign resource allocation through voter file segmentation and focused microtargeting.

Predict Vote Counts

In some embodiments, a key component in a campaign is the ability to estimate potential vote shares before the actual election. This estimation, when combined with good planning, can enable proper resource allocation to maximize vote count. Campaigns can identify demographics that have the potential to switch their vote and increase resource flow to improve their share among that particular demographic. Accurate estimation of vote counts before the election also helps campaigns differentiate certain win regions from certain loss regions. An estimation of vote count could be the difference between a narrow loss and a narrow win on Election Day.

Predicting vote counts before an election is nontrivial as voter turnout percentages can be unpredictable. This unpredictability can be due to a variety of factors such as misreported data, weather, or differing voting behavior depending on the type of election. Hence, campaigns have to estimate using multiple turnout scenarios. Using scores derived from the CVS algorithm, one can estimate expected vote counts under different turnout percentages. For a given turnout percentage tp %, a random sample of size tp %×|$V_f$| is drawn from the voter file $V_f$. The associated CVS derived scores for this sample are tabulated. For each record, if the associated CVS score is less than or equal to the boundary threshold t, then that record is tallied as a vote for candidate $c_1$. If the score is greater than the boundary threshold t, then it is counted as a vote for candidate $c_2$. This rule is repeated for all the records in the random sample, and the tally counts for $c_1$ and $c_2$ are tabulated to get vote counts for each candidate.

Voter File Segmentation

Another exemplary application of CVS scores is the ability to segment and filter a large voter file into smaller targeted segments for effective microtargeting during a political campaign. A subset of voters that match a given demographic profile can be identified and CVS scores can be used to identify the most likely supporters within that subset. This makes resource allocation more efficient.

As an example, Louisiana has a large proportion of white voters who are registered as Democrats (about 30.3% based on the Louisiana Secretary of State data), but historically tend to vote for a Republican candidate. One example of this is older voters whose voting habits have changed, but who have not changed their registered party affiliation. This has been noted in both previous academic work and in the press.

This is a valuable test case for the CVS algorithm as the party of registration does not help in predicting actual voting behavior. The CVS model scores from this methodology can predict this segment with a high degree of accuracy. The CVS model scores correctly predict this group of Republican-leaning registered Democrats representing 14.7% of the total white voter registrations (~400,000 voters in a 3,000,000 voter file). This shows the value of how these scores provide pinpointed targeted information that can help guide campaigns in reaching their likely supporters.

Figure 6:
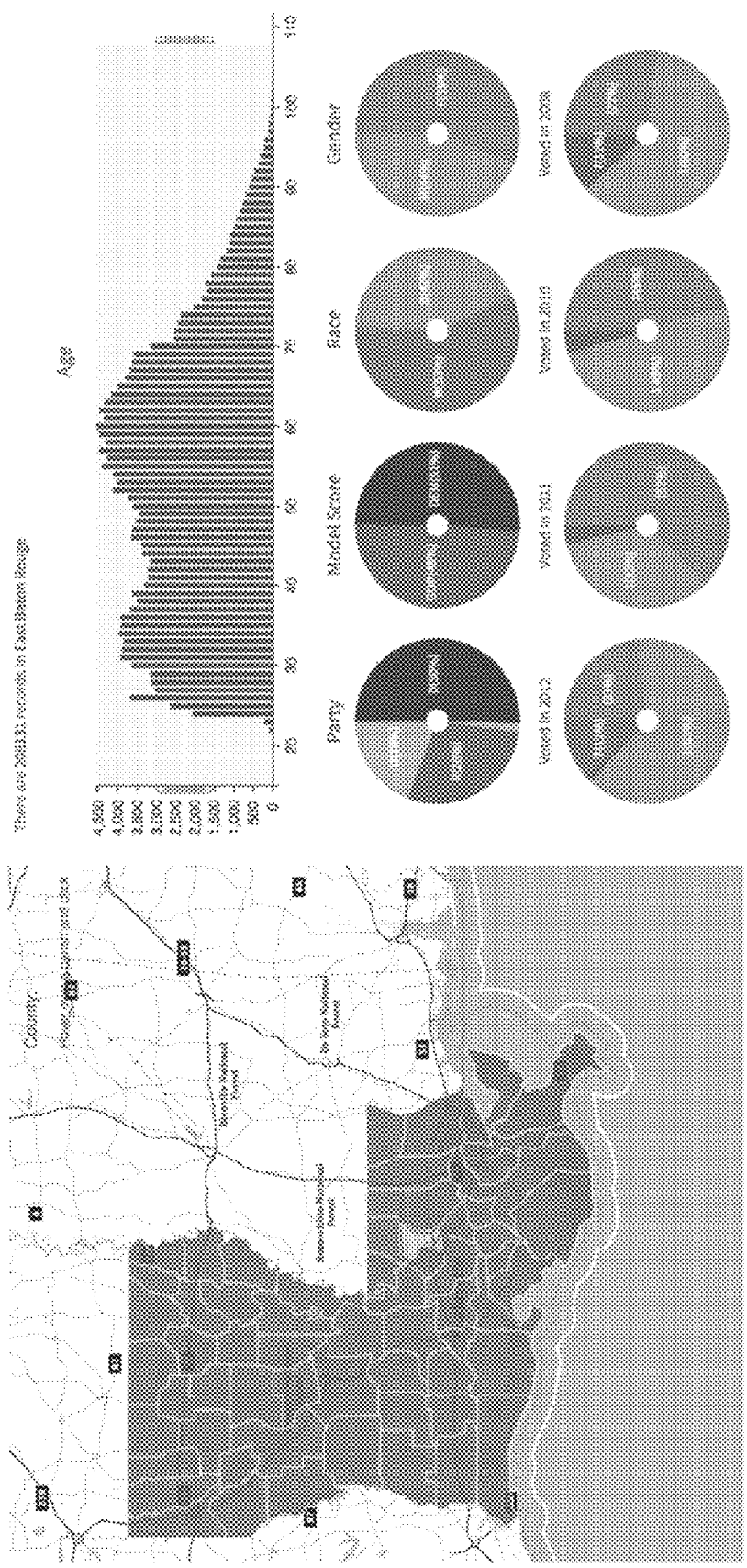
FIG. 6 illustrates a screenshot of an exemplary visualization framework for visualizing voter segments based on various covariates in a population.

The authors also developed a visualization framework that utilizes the voter file information and the predictive scores to effectively segment voters based on various covariates such as age, race, gender, and voting behavior. The visualization framework is available at the following URL, note that voter contact information anonymized (datadecisions.lsu.edu/vfdemo). This visualization serves as an application of the predictive scores to dissect big data voter files and create custom audiences for campaign outreach events such as direct mail, tele-town hall meetings, and phone banking. Creating custom audiences using these predictive scores can result in large savings for small, medium, and large-sized political campaigns. The savings come by minimizing wastage and streamlining outreach audiences. During the 2014 Louisiana Senate campaign nearly $100,000 could have been saved over just 10 direct mail outreach efforts using predictive scores to develop in-house voter contact lists instead of renting lists from external vendors. The predictive scores are grouped under the pie chart labeled "Model Score" in the visualization. A screenshot of the tool is provided as FIG. 6.

EXAMPLES

The CVS algorithm was tested during three live election campaigns. The first two elections were the 2014 primary and runoff elections for the U.S. Senate seat from Louisiana.

The other election was the 2015 Louisiana Governor's election. For each of the elections, the CVS algorithm generated scores for ~3 million individuals in the Louisiana voter file. The scores were applied to predict the early vote outcomes soon after the early voting period ended. Typically, the early voting period lasts about 6 days, ending about a week before the actual election day. In the 2014 U.S. Senate Primary, the early voting period lasted from October 21 to October 28 (October 26 was not included as this date was a Sunday). Election Day for the 2014 Primary was November 4.

Table 8 compares the CVS model prediction of early vote results with the actual results for both the primary and runoff elections for Louisiana's U.S. Senate elections of 2014. In the primary election, the model predicted a Republican vote share of 52.3% (and a Democratic vote share of 47.7%). The actual early voting result for the Republican vote share, declared a week after early voting had been completed and after the CVS model had made its prediction, was 52.8%. The predicted result was 0.5% off the actual result. In the runoff election, the model predicted result was off by a mere 1.6%.

TABLE 8

Early vote predictions using CVS algorithm during the 2014 U.S. Senator election in Louisiana

| Election | Model predicted, % | Actual result, % |
|---|---|---|
| Primary-Republican Party vote share | 52.3 | 52.8 |
| Runoff-Republican Party vote share | 57.3 | 58.9 |

Table 9 compares the performance of the CVS Model with the actual 2014 Louisiana's U.S. Senate Runoff Election result and to an analysis conducted by the nationally renowned prediction blog fivethirtyeight.com. By this metric, the CVS Model prediction of the result (predicted a day before the actual election) was a mere 0.2% from the actual result. In contrast, the FiveThirtyEight blog analysis was off by 1.9%.

TABLE 9

Model predictions versus actual results (2014 U.S. Senator runoff election)

| Election | Republican, % | Democrat, % | Difference from actual result, % |
|---|---|---|---|
| FiveThirtyEight analysis (Dec. 5, 2014) | 57.8 | 42.2 | 1.9 |
| CVS model predicted (Dec. 5, 2014) | 56.1 | 43.9 | 0.2 |
| Actual result | 55.9 | 44.1 | — |

The CVS model was also applied to the runoff election of the 2015 Louisiana Governor's race. Table 10 provides model derived vote share estimates (model run 3 weeks before the actual election). The table shows that the model was off from the actual result by a mere 0.9%.

TABLE 10

Model predictions versus actual results (2015 Louisiana Governor's runoff election)

| Election | Republican, % | Democrat, % | Difference from actual result, % |
|---|---|---|---|
| CVS model predicted (Nov. 6, 2015) | 44.8 | 55.2 | 0.9 |
| Actual result | 43.9 | 56.1 | — |

In summary, Tables 8-10 provide strong evidence of the accuracy of the CVS model derived predictions under live election scenarios.

A hybrid machine learning approach was developed to predict election outcomes more accurately. The methodology is based on individualized scores that give an indication of an individual's preference for a particular candidate or election issue. The proposed method accurately predicted vote counts for three Louisiana elections. The accuracy of this predictive methodology was further validated by the closeness of predicted vote counts to the actual election results.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present disclosure may comprise or utilize a special-purpose or general-purpose computer system that includes computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the disclosure may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A computer-implemented method for generating a predictive model, the method comprising:
   accessing data from a dynamic dataset and from a static dataset;
   generating a unique individual profile for each of a plurality of subjects within a population, the unique individual profile being generated from the data in the dynamic and the static datasets;
   assigning a class attribute to each of the plurality of subjects;
   developing a classification model based on the unique individual profile and the class attribute for each of the plurality of subjects;
   generating an individual score for each of the plurality of subjects using the classification model,
   wherein the individual score lies within a range of [0, 1];
   wherein the range further comprises a threshold, t, the threshold, t, defining a boundary between a first predicted outcome and a second predicted outcome;
   wherein the first predicted outcome comprises [0, t] and the second predicted outcome comprises (t, 1];
   identifying one or more undecided individual records that are explicitly identified as unaffiliated with both a first class and a second class;
   calculating a median score among the one or more undecided individual records; and assigning the median score as the threshold, t; and
   predicting an outcome of an event between the first predicted outcome and the second predicted outcome using the threshold, t, based on an aggregated count of the individual scores for the plurality of subjects.

2. The computer-implemented method as in claim 1, wherein the dynamic dataset comprises one or more of: poll results, donation data, grassroots survey results, or field-based information.

3. The computer-implemented method as in claim 1, wherein the static dataset comprises one or more of: voter registration data for any of the plurality of subjects, a voting history for any of the plurality of subjects, consumer data for any of the plurality of subjects, or demographic attributes associated with any of the plurality of subjects individual or a household comprising any of the plurality of subjects.

4. The computer-implemented method as in claim 3, wherein the consumer data comprises one or more of: a behavioral consumer habit, a hobby, or a recreational interest.

5. The computer-implemented method as in claim 1, wherein the unique individual profile for each of the plurality of subjects is generated by linking a first portion of data within the dynamic dataset with a corresponding second portion of data within the static dataset.

6. The computer-implemented method as in claim 5, wherein the first portion of data comprises a phone number and the corresponding second portion of data comprises a matching phone number.

7. The computer-implemented method as in claim 1, wherein assigning the class attribute comprises identifying a response to a ballot question, the response being an election between a first candidate or a second candidate selected from a top two candidates or between a first party or a second party selected from a two most dominant parties.

8. The computer-implemented method as in claim 1, further comprising updating the dynamic dataset with campaign specific information.

9. The computer-implemented method as in claim 1, wherein the event comprises an election, the outcome comprising the first predicted outcome and the second predicted outcome, wherein predicting the outcome of the election comprises determining a percentage of individual scores associated with one or both of the first predicted outcome or the second predicted outcome relative to a total of the individual scores for the plurality of subjects.

10. The computer-implemented method as in claim 1, wherein the classification model is developed using a Random Forest machine learning process.

11. A system for generating a predictive model, the system comprising:
one or more processors; and
one or more computer-readable mediums having stored thereon executable instructions that when executed by the one or more processors configure a computer system to perform at least the following:
access data from a dynamic dataset and from a static dataset;
generate a unique individual profile for each of a plurality of subjects within a population, the unique individual profile being generated from the data in the dynamic and the static datasets;
assign a class attribute to each of the plurality of subjects; develop a classification model based on the unique individual profile and the class attribute for each of the plurality of subjects; and
generate an individual score for each of the plurality of subjects using the classification model,
wherein the individual score for each of the plurality of subjects comprises a number between [0, 1], wherein a threshold value, t, distinguishes between a first predicted outcome of the predictive model and a second predicted outcome of the predictive model, the first predictive outcome comprising any individual score between [0, t] and the second predicted outcome comprising any individual score between (t, 1];
identify one or more undecided individual records that are explicitly identified as unaffiliated with both a first class and a second class;
calculate a median score among the one or more undecided individual records; and assigning the median score as the threshold value, t; and
predict an outcome of an event between the first predicted outcome and the second predicted outcome using the threshold, t, based on an aggregated count of the individual scores for the plurality of subjects.

12. The system as in claim 11, wherein the unique individual profile for each of the plurality of subjects is generated by linking a first portion of data within the dynamic dataset with a corresponding second portion of data within the static dataset.

13. The system as in claim 11, wherein assigning the class attribute comprises identifying a response to a ballot question, the response being an election between a first candidate or a second candidate selected from a top two candidates or the response being an election between a first party or a second party selected from a two most dominant parties.

14. The system as in claim 11, wherein predicting the outcome of the event comprises calculating a first total number of individual scores associated with the first predicted outcome; calculating a second total number of individual scores associated with the second predicted outcome; wherein the predicted outcome comprises a higher total number between the first total number and the second total number.

15. The system as in claim 11, wherein the dynamic dataset comprises one or more of: poll results, donation data, grassroots survey results, or field-based information.

16. The system as in claim 11, wherein the static dataset comprises one or more of: voter registration data for any of the plurality of subjects, a voting history for any of the plurality of subjects, consumer data for any of the plurality of subjects, or demographic attributes associated with any of the plurality of subjects individual or a household comprising any of the plurality of subjects.

17. One or more non-transitory computer-readable media having stored thereon executable instructions that when executed by one or more processors configure a computer system to perform at least the following:
access data from a dynamic dataset and from a static dataset;
generate a unique individual profile for each of a plurality of subjects within a population, the unique individual profile being generated by linking a first portion of data within the dynamic dataset with a corresponding second portion of data within the static dataset;
assign a class attribute for the unique individual profile for each of the plurality of subjects, wherein assigning the class attribute comprises identifying a response to a ballot question, the response being an election between a first candidate or a second candidate selected from a top two candidates or between a first party or a second party selected from a two most dominant parties;
develop a classification model based on the unique individual profile and the class attribute for each of the plurality of subjects;
generate an individual score for each of the plurality of subjects using the classification model, the individual score comprising a number between [0, 1]; and predict an outcome of an election using the classification model, wherein predicting the outcome comprises:
- identify one or more undecided individual records that are explicitly identified as unaffiliated with both a first class and a second class;
- determining a threshold, t, that distinguishes between a first predicted outcome of the election and a second predicted outcome of the election such that the first predicted outcome comprises any individual score between [0, t] and the second predicted outcome comprising any individual score between (t, 1], wherein the threshold t is determined by calculating a median score among the one or more undecided individual records; and assigning the median score as the threshold t;
- calculating a total number of individual scores associated with the first predicted outcome and with the second predicted outcome; and
- determining a higher total number of individual scores between the total number of individual scores associated with the first predicted outcome and the second predicted outcome.

18. The one or more non-transitory computer-readable media of claim 17, wherein the executable instructions further configure the computer system to perform predicting an outcome of an event based on an aggregated count of the individual scores for the plurality of subjects.

19. The one or more non-transitory computer-readable media of claim 17, wherein the dynamic dataset comprises one or more of: poll results, donation data, grassroots survey results, or field-based information and the static dataset comprises one or more of: voter registration data for any of the plurality of subjects, a voting history for any of the plurality of subjects, consumer data for any of the plurality of subjects, or demographic attributes associated with any of the plurality of subjects individual or a household comprising any of the plurality of subjects.

20. The one or more non-transitory computer-readable media of claim 17, wherein the dynamic dataset comprises one or more of: poll results, donation data, grassroots survey results, or field-based information.

* * * * *